(No Model.)

M. R. McCLELLAND.
HARROW.

No. 605,506. Patented June 14, 1898.

WITNESSES
K. J. Phillips
J. Gregg Poole

INVENTOR
Mark R. McClelland.
by Herbert W. T. Jenner.
Attorney

UNITED STATES PATENT OFFICE.

MARK R. McCLELLAND, OF ZANESVILLE, OHIO.

HARROW.

SPECIFICATION forming part of Letters Patent No. 605,506, dated June 14, 1898.

Application filed January 6, 1898. Serial No. 665,729. (No model.)

*To all whom it may concern:*

Be it known that I, MARK R. MCCLELLAND, a citizen of the United States, residing at Zanesville, in the county of Muskingum and State of Ohio, have invented certain new and useful Improvements in Harrows; and I do hereby declare the following to be a full, clear, and exact description of the invention, such as will enable others skilled in the art to which it appertains to make and use the same.

This invention relates to harrows and other agricultural implements, such as rollers or clod-crushers; and it consists in the novel construction and combination of the parts hereinafter fully described and claimed.

Figure 1:
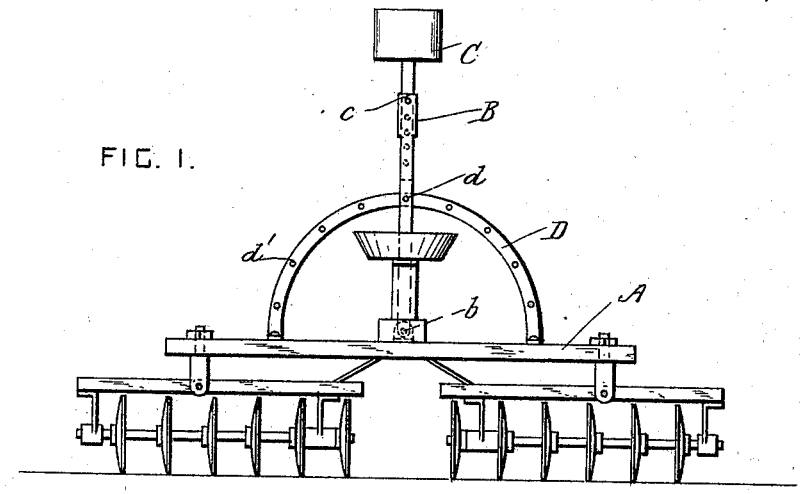
Figure 2:
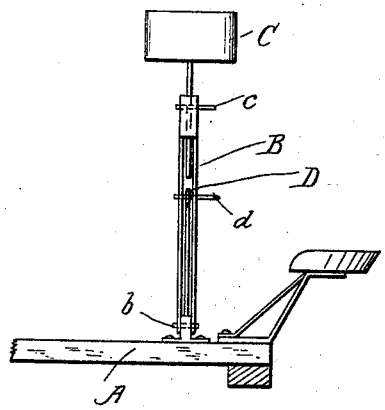
Figure 3:
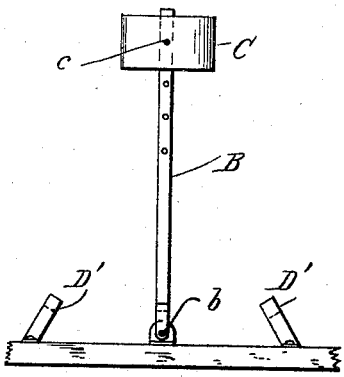

In the drawings, Figure 1 is a rear view of a harrow provided with an adjustable weighted lever according to this invention. Fig. 2 is a side view of the said lever and its support. Fig. 3 is a rear view showing a modification in the means for supporting the said lever.

A is the frame of a harrow of any approved construction, or it may be the frame of a land-roller, clod-crusher, or any other agricultural implement which is drawn over the ground and which operates to prepare its surface. The frame A is non-revoluble, and it carries the disks, teeth, or other devices which operate on the ground on each side of its central portion or draft-pole.

In order to make the harrow or other implement work better upon a hillside or in any other position where the implement can be made to work to better advantage by adjusting the relative weights of its side portions so as to equalize the downward pressure of its two sides and make the disks or teeth cut into the ground to an equal extent, a weighted lever B is provided. This lever B is pivoted to the middle part of the frame by a pin $b$ and is movable laterally in a vertical plane.

C is the weight, which is slidable longitudinally of the lever B, and $c$ is a pin or screw for securing the weight to the lever after its position has been adjusted.

D is a curved support secured to the frame A, and $d$ is a pin for connecting the lever B to the said support after it has been placed vertically or at the desired angle. The support D is provided with a series of holes $d'$ for the pin $d$ to engage with. The addition of weight to one side of the implement causes the side to which the weight is added to bear harder on the earth, and when the implement is working on a hillside the addition of a proper amount of weight to the higher side of its frame will cause the disks or teeth carried by that side of its frame to have the same depth of cut as those carried by the lower side of its frame. The lever B is preferably made in two parts, which straddle the support D.

In the modification shown in Fig. 3 the curved support D is replaced by two supports D' for the lever to rest against, and the adjustment is effected by sliding the weight upon the lever.

I am aware that it is not new to provide a rotary harrow with a weighted lever which is adjustable in a vertical plane, as shown in the patent to Bell, No. 245,341, dated August 9, 1881, for increasing the down pressure on one side and thereby causing the frame which carries the harrow-teeth to revolve in a horizontal plane as the machine is drawn along, and I do not claim the same.

What I claim is—

1. The combination, with a non-revoluble frame which carries devices for operating on the ground, such as harrow disks or teeth; of a weighted lever pivoted to the middle part of the said frame, and means for supporting the said lever in a vertical position and at an angle, so as to equalize the down pressure at each side of the said frame, substantially as set forth.

2. The combination, with a non-revoluble frame which carries devices for operating on the ground, such as harrow disks or teeth; of a curved support secured to the said frame, a weighted lever formed in two parts which straddle the said support and which are pivoted to the middle part of the said frame, and means for connecting the said lever to the said support when said lever is in a vertical position and at an angle, so as to equalize the down pressure at each side of the said frame, substantially as set forth.

In testimony whereof I affix my signature in presence of two witnesses.

MARK R. MCCLELLAND.

Witnesses:
  FRANK EVANS,
  THOMAS J. MCDERMOTT.